May 18, 1954   H. B. CAMPBELL ET AL   2,678,549
BEER COOLING AND DISPENSING APPARATUS
Filed Oct. 27, 1949   2 Sheets-Sheet 1

INVENTORS.
HAROLD B. CAMPBELL
ALVIN N. BLOOM
BY Caesar and Rivise
ATTORNEYS

May 18, 1954     H. B. CAMPBELL ET AL     2,678,549
BEER COOLING AND DISPENSING APPARATUS
Filed Oct. 27, 1949     2 Sheets-Sheet 2

*INVENTORS.*
HAROLD B. CAMPBELL
ALVIN N. BLOOM
BY
*Caesar and Rivise*
ATTORNEYS

Patented May 18, 1954

2,678,549

UNITED STATES PATENT OFFICE 2,678,549

BEER COOLING AND DISPENSING APPARATUS

Harold B. Campbell and Alvin N. Bloom, Philadelphia, Pa., assignors to Uniflow Manufacturing Company, Erie, Pa.

Application October 27, 1949, Serial No. 123,806

4 Claims. (Cl. 62—141)

This invention relates to beer cooling and dispensing apparatus, and has for its primary purpose the provision of an apparatus of greatly improved and simplified structure, which is compact, portable and rugged, which can be installed very readily and inexpensively, which requires a minimum amount of attention, maintenance and servicing, which operates in a positive, economical, highly efficient and sanitary manner, and which is very flexible in its operation so that greatly varying amounts of beer at the proper temperature may be drawn.

Another important object is to provide an apparatus of the foregoing type which is adapted to store beer at substantially above the dispensing temperature so as to prevent hibernation of the $CO_2$ gas and consequent flatness of taste, and to cool the beer gradually as it flows toward the dispensing taps so as to prevent shocking and consequent discoloration of the beverage.

Another object of importance is to provide a beer cooling and dispensing apparatus, which is adapted to dispense beer at the proper temperature regardless of whether the beer in the kegs is above or below said temperature.

Another important object is to provide an apparatus for cooling beer which operates to bring barrelled beer to proper drinking temperature without the necessity of building ice.

Another object of considerable importance is to provide a beer cooling apparatus having a maximum amount of cooling area in a minimum amount of space. The importance of this feature is that beer cooling and dispensing apparatus of the invention may be installed in buildings where space is either very expensive or limited, as well as in localities where because of local conditions there are no cellars or basements available for storing kegs of beer.

A further important object is to provide a beer cooling and dispensing apparatus, the mechanical parts of which are readily accessible for servicing or replacement and for replenishment of the beer supply.

Still another object is to provide a beer cooling and dispensing apparatus which fulfills all the use requirements of such apparatus and at the same time is free of the disadvantages and shortcomings of prior art devices.

The foregoing are only some of the objects and purposes of the invention and other objects as well as advantages will appear as the description proceeds.

The underlying concept of the invention is capable of being embodied in many forms of apparatus differing in mechanical details. In its simplest form the beer cooling and dispensing apparatus comprises a casing provided with a compartment for housing a keg of beer and a container for refrigerated water, said container being provided with a tap or faucet, a relatively long pipe connecting said keg and said faucet, a conduit surrounding the major portion of said beer pipe, one end of said conduit being connected to said container and the other end being connected to a header, a pipe connecting said header and said container, and means for pumping refrigerated water from said container into and through the conduit and about the beer pipe and back into the container through said header and connecting pipe. The water in the container may be kept at a desired low temperature by the provision of a refrigeration coil immersed in said container, said coil constituting part of a refrigerating system. The compartment containing the beer keg is preferably refrigerated, and means are provided for forcing the beer from keg into the beer line.

The presently-preferred embodiment of the invention is shown in the accompanying drawings for the purpose of illustration and exemplification. Referring briefly to said drawings, it will be seen that:

Figure 3 is another cross-section, taken substantially on line 3—3 of Figure 2, with all the piping left in.

Figure 1:
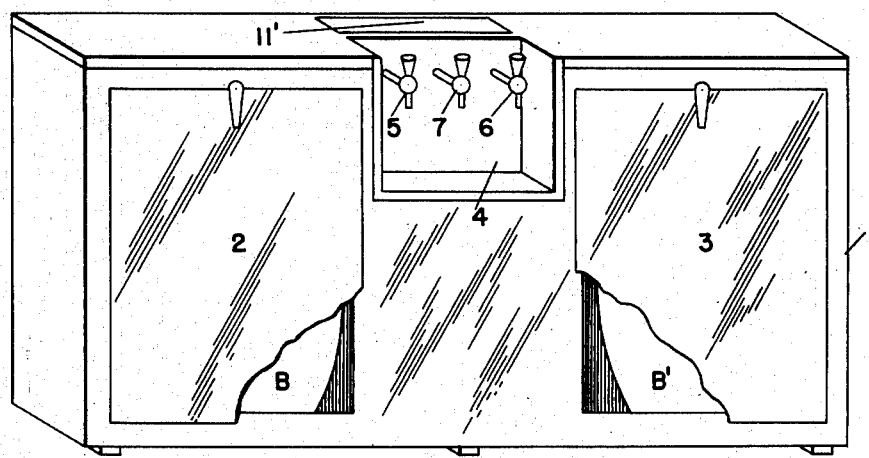
Figure 1 is a perspective view of the beer cooling and dispensing apparatus constituting the presently-preferred embodiment, shown encased in a suitable cabinet.
Figure 4:
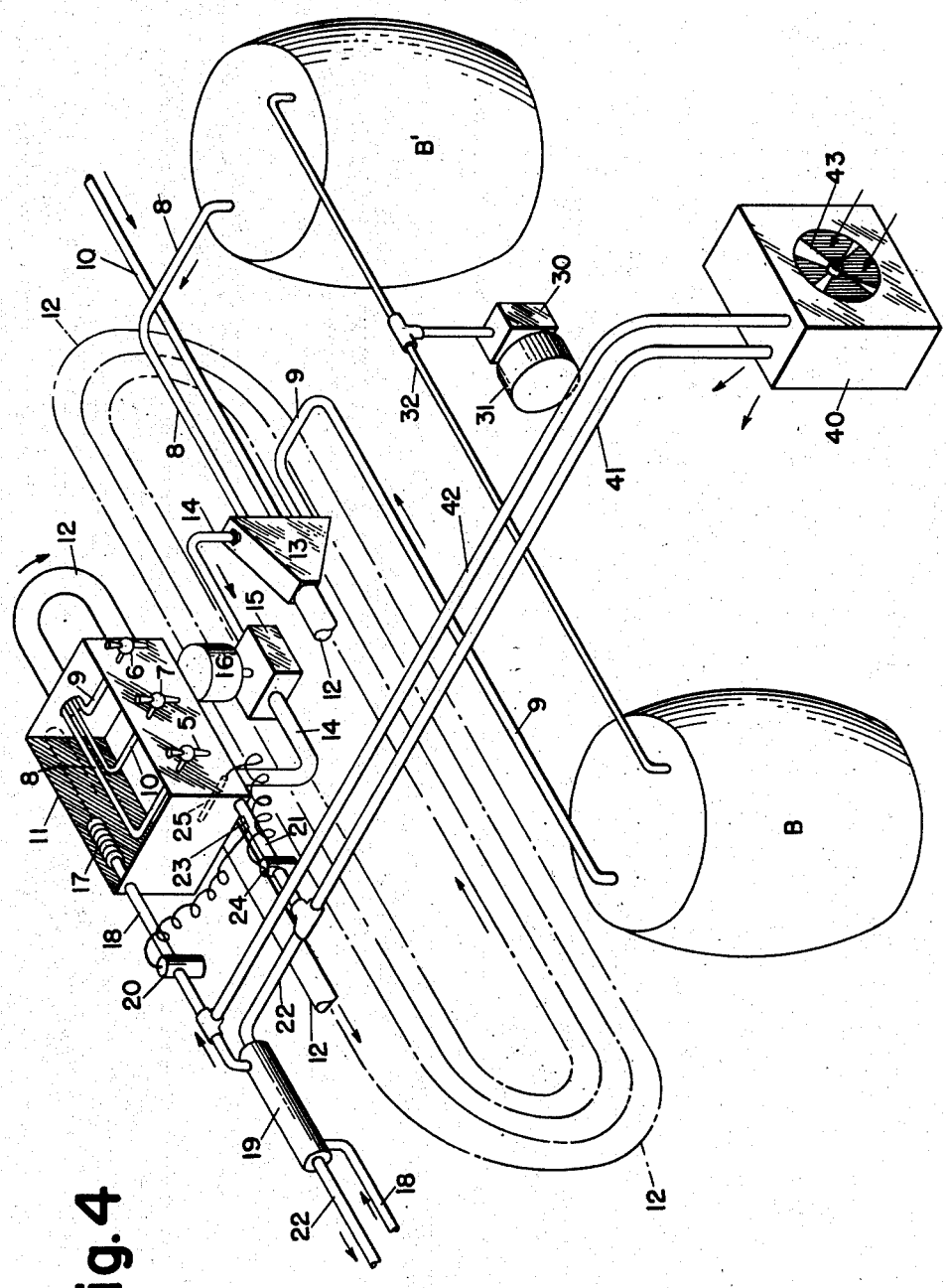
Figure 4 is a view schematically and diagrammatically illustrating the essential refrigerating components of the apparatus, the cabinet being omitted and the components being shown spread apart for the purpose of achieving greater clarity of illustration.

Referring to the drawings in greater detail and particularly to Figure 1, thereof, it will be seen that the apparatus is encased in a suitably insulated cabinet 1. The cabinet may advantageously be of substantially rectangular form, and is provided, as shown, with the doors 2 and 3 through which beer kegs may be placed within the cabinet or removed therefrom, and with a rectangular recess 4 within which are positioned the three taps, faucets or spigots 5, 6, 7. Two of the taps, such as 5 and 6 may be for beer and the third one may be for water. The two doors are preferably disposed one at each lateral end of the cabinet, and extend substantially the full height. The recess 4 is preferably disposed between the two doors at the upper part of the cabinet. The dimensions do not constitute an essential feature of the invention, but it may be stated that the cabinet is preferably about the height of a conventional bar so as to be capable of receiving beer kegs of conventional form. The width and depth of the cabinet are sufficient to receive the mechanical parts of the apparatus except the condensing unit, the parts being so arranged as to provide adequate space for two beer kegs. The top of the cabinet is flat so that it can be used as a bar. The kegs of beer are designated by the letters B and B' (see Figures 1 and 4).

Reference numerals 8 and 9 (see Figure 4), denote pipes which convey beer to the taps 5 and 6 respectively, and 10 indicates a pipe which conveys water to the tap 7. These pipes extend into a coil box 11 containing refrigerated fresh water, which is disposed in the space behind the recess 4, and thence through a common conduit 12 to a header or manifold 13. The coil box is open at the top and is provided with a lid 11' to provide ready access to the interior thereof. The pipes 8 and 9 extend from the header 13 to the barrels B and B' respectively, and the pipe 10 extends from the header to a fresh water supply. The header 13 is connected by means of a pipe 14 to the coil box 11. The reference numeral 15 denotes a suitable form of pump in the pipe line 14, which is actuated by means of a motor 16 to pump water continuously from the coil box 11 through the entire length of the conduit 12 and about the pipes 8, 9 and 10 to the header 13 and back through the pipe 14 to the coil box 11.

Figure 2:
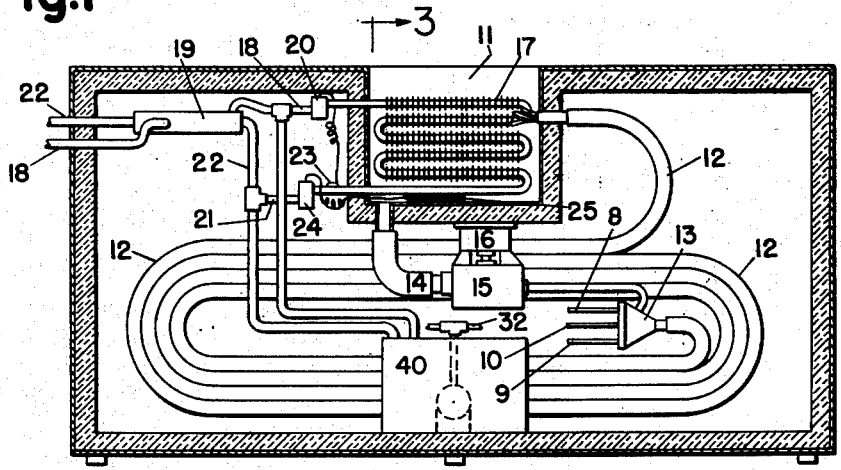
Figure 2 is a cross-section through the cabinet of Figure 1, substantially on line 2—2 of Figure 3.
Figure 3:
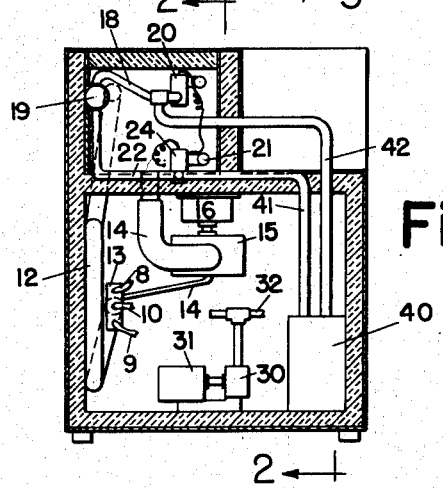

At this point, it is to be noted that the conduit 12 is made of wire-wound rubber tubing of a length of at least 25 feet and preferably greater than 30 feet. This conduit and the contained beer and water coils can be readily formed into a compact coil and secured to the rear wall as shown in Figures 2 and 3.

The water in the coil box 11 is cooled or re-refrigerated by means of an evaporator or expansion coil 17 which rests loosely in the box, and which constitutes an element of a refrigerating unit as will be described. The coil 17 has both horizontal and vertical convolutions and is of the "finned" type, so that it has about twice the effective surface area as a conventional coil of the same size and number of convolutions. The uppermost end of the coil is connected to the liquid line 18 from the condensing unit (not shown) of a refrigerating system. It is to be noted that the liquid line on its way from the condensing unit to the finned coil 17 passes through a heat exchanger 19 of suitable form. A thermostatic expansion valve 20 is provided on the line 18 near the coil box. The lowermost end of the coil 17 is connected to a pipe 21, which in turn is connected to the suction line 22, which passes through the heat exchanger 19 on its way to the condensing unit. Hence, the liquid refrigerant passing through the heat exchanger is cooled by the returning gas in the suction line.

It is to be noted that the thermostatic expansion valve 20 has its thermal control bulb 23 secured to the pipe 21 (which forms part of the suction line) where said pipe leaves the coil box 11, and that a thermostatic modulating valve 24, which has its control bulb 25 disposed in the liquid in the coil box 17, is provided on said pipe 21. It will be understood that valve 20 controls the flow of liquid refrigerant from the condensing unit (not shown) to the refrigerating coil 17 where it expands into a gas, that the valve 24 controls the return flow of the gas to the condensing unit, that the valve 20 is controlled by the temperature of the return gases, and that the valve 24 is controlled by the temperature of the water in the coil box. The water in the coil box is kept constantly refrigerated at a temperature of about 36°–38° F. and is circulated constantly as was previously stated, by means of the pump 15 through the entire length of the conduit 12 and about the pipes 8, 9 and 10 to the header 13 and back through the pipe 14 to the coil box 11. The temperature of the beer in the barrels B and B' is somewhat higher than that of the water in the coil box 11 and as the beer flows in the pipes 8 and 9 in the conduit 12 toward the taps 5 and 6, it is gradually lowered in temperature as it passes through regions surrounded by water, which progressively decreases in temperature as the beer approaches the coil box 11. The same is true of the water in the line 10 which comes from a source of fresh water and finally comes out at tap 7.

An air pressure system may be provided to force the beer out of the barrels B and B'. This system consists of an air pump 30 actuated by a suitable motor 31, and an air pressure line 32 from the pump to both barrels. The use of air pressure instead of carbon dioxide has several advantages. The air is filtered and has a pressure of 30 to 35 pounds, and serves to keep the $CO_2$ content of the beer constant. The use of $CO_2$ for this purpose would serve to raise the $CO_2$ content and seriously affect the taste.

The preferred embodiment is provided with a cold air diffuser 40 of suitable form between the two barrels, which serves to lower the temperature of the beer compartment. This diffuser is provided with refrigerating coils (not shown), which are connected to the suction line 22 by the pipe 41 and to the liquid line 18 by the pipe 42. As shown the diffuser is provided with a suitable fan 43.

The cooling of the compartment serves to prevent the beer from souring (secondary fermentation), and to prevent the natural brewed in carbon dioxide from leaving the liquid. The fact that the beer lines are surrounded by increasingly colder water as they approach the taps serves to gradually lower the beer temperature, thus preventing sudden shock to the beer, eliminating wild beer, and rendering it certain that the beer will be at the proper temperature (40°–42° F.) when it starts to flow from the taps. In case it should happen, as it sometimes does, that the beer in the barrels is delivered by the brewery to the tap room at a temperature lower than that of the water in the coil box 11, the temperature of the beer will be brought up gradually to the proper drinking temperature by the time it reaches the taps.

It will be understood that the foregoing disclosure is illustrative and exemplary of the invention, and not restrictive thereof.

We claim:

1. A beer cooling and dispensing apparatus comprising a casing of substantially rectangular cross-section both horizontally and vertically, a compartment for a beer keg at each lateral end of said casing, a recess provided centrally of said casing between said compartments, a container for refrigerator water behind said recess, said container being provided with two taps, one for each beer keg, two relatively long pipes, each pipe connecting one of said kegs to one of said taps, a common conduit surrounding the major portion of said pipes, means for forcing beer from said kegs through said pipes to said taps, and means for forcing refrigerated water from said container into and through said conduit and about said pipes, the direction of flow of the refrigerated water being opposite in direction to that of the beer.

2. A beer cooling and dispensing apparatus comprising a casing of substantially rectangular cross-section both horizontally and vertically, a compartment for a beer keg at each lateral end of said casing, a recess provided centrally of said casing between said compartments, a container for refrigerator water behind said recess, said container being provided with two taps, one for each beer keg, two relatively long pipes, each pipe connecting one of said kegs to one of said taps, a common conduit surrounding the major portion of said pipes, means for forcing beer from said kegs through said pipes to said taps, and means for forcing refrigerated water from said container into and through said conduit and about said pipes, the direction of flow of the refrigerated water being opposite in direction to that of the beer, said conduit and encased pipes being formed into a coil and disposed against the back wall of said casing.

3. A beer cooling and dispensing apparatus comprising a casing of substantially rectangular cross section both horizontally and vertically, a compartment for a beer keg at each lateral end of a casing, a coil box provided centrally of said casing and between said compartments and spaced from the front edge of said casing, said coil box defining a container for refrigerated water, refrigerating means in said container, said container being provided with two taps, one for each beer keg, two relatively long pipes, each pipe connecting one of said kegs to one of said taps, a common conduit surrounding the major portion of said pipes, means for forcing beer from said kegs through said pipes to said taps, and means for forcing refrigerated water from said container into and through said conduit and about said pipes, the direction of flow of the refrigerated water being opposite in direction to that of the beer.

4. A beer cooling and dispensing apparatus comprising a casing, a compartment for a plurality of beer kegs in said casing, refrigeration means for said compartment, a coil box provided in said casing adjacent the top thereof defining a container for refrigerated water and spaced from the front edge thereof, refrigerating means in said container, said container provided with taps, one for each beer keg, two relatively long pipes, each pipe connecting one of said kegs to one of said taps, a common conduit surrounding the major portion of said pipes, means for forcing beer from said kegs through said pipes to said taps, and means for forcing refrigerated water from said container into and through said conduit and about said pipes, the direction of flow of the refrigerated water being opposite in direction to that of the beer.

References Cited in the file of this patent

UNITED STATES PATENTS

| Number | Name | Date |
|---|---|---|
| 2,140,816 | Seitz | Dec. 20, 1938 |
| 2,150,253 | Martin | Mar. 14, 1939 |
| 2,194,319 | Panagopoulos | Mar. 19, 1940 |
| 2,211,527 | Straub | Aug. 13, 1940 |
| 2,253,940 | Peet | Aug. 26, 1941 |
| 2,257,070 | Perlick | Sept. 23, 1941 |
| 2,342,299 | Peet | Feb. 22, 1944 |
| 2,450,735 | Millet | Oct. 5, 1948 |
| 2,485,610 | Kromer | Oct. 25, 1949 |
| 2,494,512 | Kafer | Jan. 10, 1950 |